United States Patent [19]

Nakhamkin

[11] Patent Number: 4,885,912
[45] Date of Patent: Dec. 12, 1989

[54] COMPRESSED AIR TURBOMACHINERY CYCLE WITH REHEAT AND HIGH PRESSURE AIR PREHEATING IN RECUPERATOR

[75] Inventor: Michael Nakhamkin, Mountainside, N.J.

[73] Assignee: Gibbs & Hill, Inc., New York, N.Y.

[21] Appl. No.: 49,870

[22] Filed: May 13, 1987

[51] Int. Cl.$^4$ .............................. F02C 6/16; F02C 9/00
[52] U.S. Cl. ........................................ 60/652; 60/659; 60/727
[58] Field of Search .................. 60/652, 659, 650, 682, 60/683, 39.17, 39.183, 727

[56] References Cited

U.S. PATENT DOCUMENTS

| 3,988,897 | 11/1976 | Strub ................................. 60/652 X |
| 4,100,745 | 7/1978 | Gyarmathy et al. ................. 60/652 |
| 4,147,204 | 4/1979 | Pfenninger ........................... 165/4 |
| 4,150,547 | 4/1979 | Hobson .............................. 60/652 X |
| 4,237,692 | 12/1980 | Ahrens et al. ..................... 60/652 X |
| 4,275,310 | 6/1981 | Summers et al. ................. 60/652 X |
| 4,522,024 | 6/1985 | Zaugg ................................. 60/39.05 |
| 4,523,432 | 6/1985 | Frutschi ............................. 60/659 |

FOREIGN PATENT DOCUMENTS

| 0115826 | 9/1981 | Japan ..................................... 60/727 |
| 604028 | 6/1948 | United Kingdom ............. 60/39.183 |

*Primary Examiner*—Allen M. Ostrager
*Attorney, Agent, or Firm*—Pennie & Edmonds

[57] ABSTRACT

A peaking/intermediate power plant is disclosed having a compression mode in which air is compressed and stored in a storage device and an expansion mode in which such stored compressed air is initially pre-heated by exhaust gas in a recuperator, expanded without combustion in a high pressure turbine, combined with fuel and combusted in a low pressure combustor, expanded in a low pressure turbine, and supplied to the recuperator as exhaust gas of sufficient temperature to heat the compressed air enough to eliminate the need for is combustion prior to supply to the high pressure turbine.

26 Claims, 1 Drawing Sheet

COMPRESSED AIR TURBOMACHINERY CYCLE WITH REHEAT AND HIGH PRESSURE AIR PREHEATING IN RECUPERATOR

CROSS-REFERENCE TO RELATED APPLICATIONS

Related U.S. patent applications are "Retrofit of Simple Cycle Gas Turbines For, Compressed Air Energy Storage Application" (Ser. No. 049650), "Compressed Air Energy Storage Turbomachinery Cycle with Compression Heat Recovery Storage, Steam Generation and Utilization During Power Generation" (Ser. No. 048852), "Utilization of Circulating Fluidized Bed Combustors for Compressed Air Energy Storage Application" (Ser. No. 049649) and "Advanced Recuperator" (Ser. No. 048849), all of which are filed concurrently and are incorporated herein by reference.

BACKGROUND OF THE INVENTION

This invention relates generally to the storage and subsequent recovery of energy and more specifically to the compression and storage of air during a compression mode in a Compressed Air Energy Storage (CAES) system and the subsequent recovery of such stored energy during a power generation mode in a turboexpander train wherein compressed air input to a high pressure turbine is reheated in a recuperator without the need for high pressure combustor(s), and high pressure turbine exhaust is heated in a low pressure combustor.

CAES power plants have become effective contributors to a utility's generation mix as a source of peaking or intermediate energy and spinning reserve. CAES plants store off-peak energy from relatively inexpensive energy sources such as coal and nuclear baseload plants by compressing air into storage devices such as underground caverns or reservoirs. Underground storage can be developed in hard rock, bedded salt, salt dome or aquifer media.

Following off-peak storage, the air is subsequently withdrawn from storage, heated, combined with fuel in combustors and expanded through expanders, i.e., turbines, to provide needed peaking/intermediate power. Since inexpensive off-peak energy is used to compress the air, the need for premium fuels, such as natural gas and imported oil, is reduced by as much as about two thirds compared with conventional gas turbines.

Compressors and turbines in CAES plants are each connected to a synchronous electrical machine such as a generator/motor device through respective clutches, permitting operation either solely of the compressors or solely of the turbines during appropriate selected time periods. During off-peak periods (i.e., nights and weekends), the compressor train is driven through its clutch by the generator/motor. In this scheme, the generator/motor functions as a motor, drawing power from a power grid. The compressed air is then cooled and delivered to underground storage.

During peak/intermediate periods, with the turbine clutch engaged, air is withdrawn from storage and then heated and expanded through a turbine to provide power by driving the generator/motor. In this scheme, the generator/motor functions as a generator, providing power to a power grid. To improve the CAES heat rate, waste heat from a low pressure turbine exhaust is used to pre-heat high pressure turbine inlet air in a recuperator. The compression process of the CAES plant is characterized by a much higher overall compression ratio than that for conventional gas turbines. This requires multistage compression with intercoolers in order to improve CAES plant efficiency.

For a more complete discussion of CAES systems, see Nakhamkin, M. et al. "Compressed Air Energy Storage: Plant Integration, Turbomachinery Development", ASME International Gas Turbine Symposium and Exhibition, Beijing, Peoples'Republic of China, 1985 and Nakhamkin, M. et al. "Compressed Air Energy Storage (CAES): Overview, Performance and Cost Data for 25MW to 220MW Plants", Joint Power Generation Conference, Toronto, Canada, 1984, both incorporated herein by reference.

The turbomachinery associated with a conventional CAES plant has high pressure and low pressure turbines with high pressure and low pressure combustors, respectively. Fuel is mixed with compressed air and combusted at essentially constant pressure in these combustors, thus producing mixtures of products of combustion with high temperatures. The high temperature mixtures are then expanded in series through the high pressure and low pressure turbines, thereby performing work. Each turbine generally has an optimum expansion ratio (i.e., ratio of turbine input pressure to turbine output pressure) resulting in the highest possible efficiency for a specific turbine inlet temperature. The efficiency and optimum pressure ratio increase with increasing turbine inlet temperatures.

Turbine trains used in CAES systems have associated therewith an overall expansion ratio which is the product of expansion ratios of individual turbines which are serially connected. The overall expansion ratio of a turbine train comprising high and low pressure turbines is the ratio of turbine train input pressure (to a high pressure turbine) to turbine train output pressure (exhaust from a low pressure turbine), and generally ranges for CAES applications from 20 to 100 or more.

The overall expansion ratio is distributed between the high pressure and low pressure turbines in order to result in the highest possible efficiency. For equal high pressure and low pressure turbine inlet temperatures, the expansion ratios of the high pressure and low pressure turbines are approximately equal for a conventional CAES plant having a recuperator. For example, for the illustrative case in which the overall expansion ratio is 60, the expansion ratio of the high pressure and low pressure turbines will be $\sqrt{60}$.

The expansion ratio of a single turbine may be modified by the addition or deletion of component turbine stages. An increase in the number of component turbine stages in a turbine generally relates to an increase in the expansion ratio of the turbine. Typically, turbines having an expansion ratio of four have two turbine stages, turbines having an expansion ratio of $\sqrt{60}$ have three turbine stages and turbines having an expansion ratio of fifteen have four or five turbine stages.

Due to generally high air storage pressures, CAES plants are associated with high operating pressures and high expansion ratios. A proposed solution is to design a high pressure combustor which operates at pressures associated with CAES plants. However, there is no operating experience with combustors at the pressures that are encountered in high pressure turbines of CAES plants, although combustors operating at pressures up to 30 bar are relatively numerous and are adequate for use with low pressure turbines. More specifically, there is no operating experience with the high pressures of 60 bar and above that may be encountered in the high pressure turbines of CAES systems.

An additional proposed solution is to throttle the pressure of the compressed air input of the expansion train to a pressure level at which combustors are presently available. However, such a solution is not economical due to the waste of energy, stored as pressure in the compressed air, in reducing the pressure level prior to input to the expansion train.

Since adequate high pressure combustors are not believed to exist, nor is system operation at a reduced pressure economical, a need arises for a CAES system which does not require a high pressure combustor for proper operation.

SUMMARY OF THE INVENTION

The present invention comprises a method and apparatus for eliminating the need for a high pressure combustor in a CAES system by increasing the temperature of cold compressed air (from underground storage) in a recuperator which recovers low pressure turbine exhaust heat otherwise wasted. The compressed air which is preheated in the recuperator is expanded in the high pressure turbine and then directed to a conventional low pressure combustor and expanded in a low pressure turbine. This cycle takes advantage of the use of high pressure compressed air and avoids the use of high pressure combustors which do not have previous operating experience. In contrast to the conventional turbomachinery train wherein system optimization results in low and high pressure turbines having equal expansion ratios, system optimization in the present invention results in different expansion ratios for low and high pressure turbines. Generally, the low pressure turbine's ratio is reduced while the high pressure turbine's ratio is increased, resulting in increased low pressure turbine exhaust temperature, which is used in the recuperator to preheat compressed air entering the high pressure turbine.

By eliminating the requirement of a high pressure combustor, a less costly and more reliable system is obtained.

Furthermore, as compared with a simple cycle gas turbine, generally comprising only a low pressure combustor and a low pressure turbine, with the same maximum temperature, the present invention accommodates the required higher inlet pressures with a reduced fuel-related heat rate (BTU/kWh) and reduced specific air consumption (lbs. of air required to generate one kWh of peaking energy). In order to accommodate such higher pressures, steam turbine derivative components are utilized having inlet temperatures less than their maximum design temperature, illustratively 1000°F.

Accordingly, it is a primary object of the present invention to provide new and improved energy storage and recovery system.

Another object of the present invention is to eliminate the requirement of presently unavailable high pressure combustors in expansion trains of power plants.

A further object of the present invention is to provide high pressure turbines with compressed air having temperature increased in a recuperator.

A still further object of the present invention is to provide a CAES system requiring generally conventional components.

Another object of the present invention is to increase the exhaust gas output temperature of a low pressure turbine in a CAES system, thus providing additional heat for heating compressed air which is to be expanded in a high pressure turbine without the need for a high pressure combustor.

BRIEF DESCRIPTION OF THE DRAWINGS

These and other objects, features and advantages of the invention will become more readily apparent with reference to the following description of the invention in which the drawing is a schematic diagram of a CAES system which does not require a high pressure combustor.

DETAILED DESCRIPTION OF THE INVENTION

Figure 1:
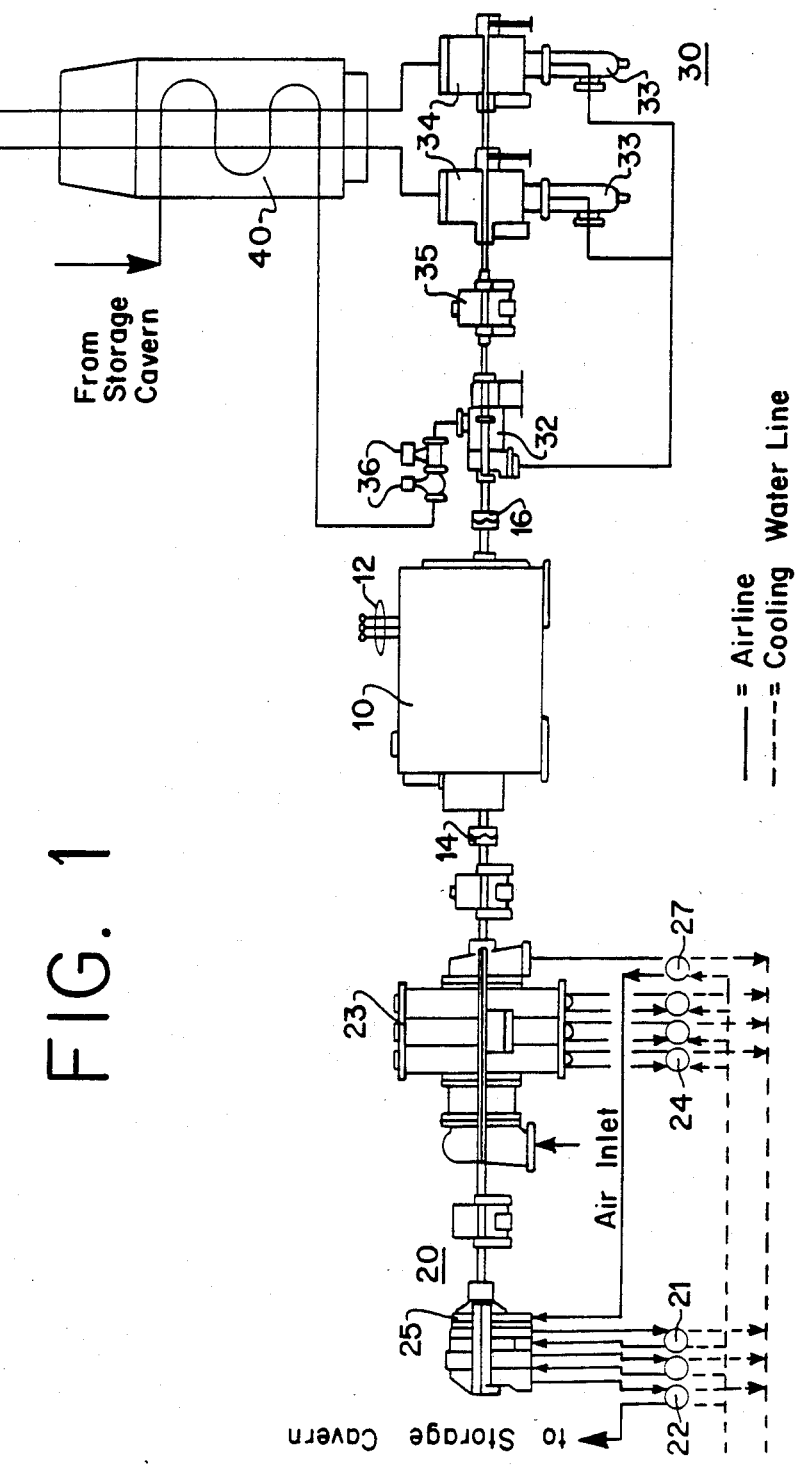

Referring to the drawing, there is shown a preferred embodiment of the present invention comprising a motor/generator 10, a compression train 20, an expansion or turbine train 30 and a recuperator 40.

More specifically, motor/generator 10 is connected to a baseload power generating plant via power transmission line 12. Motor/generator 10 is also physically coupled to compression train 20 through a clutch 14 which permits the motor/generator to be selectively connected to or disconnected from the compression train. The output of compression train 20 comprises compressed air and is input to aftercooler 22 which cools the compressed air to a temperature adequate for storage in an underground storage device (not shown).

In the preferred embodiment, compression train 20 further comprises a low pressure compressor 23 and a high pressure compressor 25 in order to efficiently compress air to required storing and operating pressures. Such pressures are highly dependent on the type and depth of the air storage device. Illustratively, a pressure range of approximately 400psi to 1000psi has been found adequate for a salt dome and aquifer formation located at a depth of approximately 1500–2000feet. Similarly, the number of compressors required in compression train 20 is dependent on the required air pressure and the type and depth of the air storage device. Low pressure compressor 23 compresses ambient air and inputs such initially compressed air into high pressure compressor 25 which further compresses the air. Low pressure compressor 23 further comprises internal intercoolers 24 and external intercooler 27 to decrease the temperature of the compressed air entering high pressure compressor 25, thereby reducing the work of compression and avoiding the use of costly high temperature materials for the compressor hardware.

Similarly, high pressure compressor 25 further comprises external intercoolers 21 to cool the air and thereby reduce the work of compression and avoid the use of costly high temperature materials for the compressor hardware. Additionally, high pressure compressor 25 is provided with an aftercooler 22. Aftercooler 22 further cools the compressed air to a temperature adequate for storage in the underground storage device. Although compressed air storage at higher temperatures may improve the thermal efficiency of the system, higher temperatures may introduce undesirable effects, such as geological and structural problems associated with underground air storage.

Generator/motor 10 is coupled to turbine train 30 through clutch 16 which permits the motor/generator to be selectively connected to or disconnected from the turbine train. Turbine train 30 comprises a high pressure turbine 32 and a low pressure turbine 34 coupled together by gear mechanism 35. Control/trip valve 36 controls the flow of heated compressed air which is input to high pressure turbine 32.

High pressure turbine 32 expands the compressed air which is preheated in recuperator 40, thereby performing work and driving generator/motor 10, thus producing electrical power. The exhaust output of high pressure turbine 32 is mixed with fuel in combustor 33 and expanded in low pressure turbine 34. Low pressure turbine 34, like high pressure turbine 32, drives generator/motor 10, thus producing electrical power to power transmission line 12.

Turbine train 30 differs from conventional turbine trains generally used in CAES systems in that its high pressure turbine is not provided with a high pressure combustor. As a result, system optimization dictates a need to increase the temperature of compressed air preheated in the recuperator and input to the high pressure turbine. Such an increase in temperature is effected by increasing the low pressure turbine exhaust gas temperature through modification of the turbine expansion ratios.

More specifically, the expansion ratio of low pressure turbine 34 is decreased by reducing the number of turbine stages relative to conventional low pressure turbines in CAES turbine trains. Similarly, the expansion ratio of high pressure turbine 32 is increased by increasing the number of turbine stages over conventional high pressure turbines in CAES turbine trains. For example, a conventional CAES turbine train comprising a low pressure and a high pressure turbine and having an overall expansion ratio of 60 is modified as follows. The expansion ratio of the low pressure turbine is decreased from its typical value of $\sqrt{60}$ to approximately four through the removal of one turbine stage, resulting in a low pressure turbine having two turbine stages. Similarly, the expansion ratio of the high pressure turbine is increased from its value of $\sqrt{60}$ to approximately 15 through the addition of one or two turbine stages, resulting in a high pressure turbine having four or five turbine stages. As will be apparent, the overall expansion ratio is 60 ($4 \times 15 = 60$) and advantageously has not been modified. This overall expansion ratio relates to compressed air stored at a pressure of 60 atm (i.e., a turbine train in which the high pressure turbine inlet pressure is 60 atm and the low pressure turbine outlet pressure is 1 atm).

Recuperator 40 is provided to increase the efficiency of the expansion process in turbine train 30. Recuperator 40 utilizes the hot exhaust gas output of low pressure turbine 34 to pre-heat compressed air from the air storage device and provide such pre-heated compressed air directly to an input of high pressure turbine 32 substituting for the combustion of fuel in a high pressure combustor.

As will be apparent to one skilled in the art, a decrease in the expansion ratio of a turbine will result in a higher temperature at the exhaust gas output of the turbine. In accordance with the present invention, therefore, such an increase in the low pressure turbine exhaust gas output temperature results in a corresponding increase in temperatures associated with the recuperator. Accordingly, such a decrease in the expansion ratio of the low pressure turbine and corresponding increase in the expansion ratio of the high pressure turbine ultimately result in increased input compressed air temperatures associated with the high pressure turbine, thus compensating for the elimination of a high pressure combustor generally found in CAES systems.

As a result, a CAES plant incorporating the present invention can achieve performance and economics which are better than for the case of using a single low pressure (LP) combuster and turbine and throttling of pressure from the stored value to the LP turbine level. The system of the present invention has significantly lower specific air consumption which reduces cavern size and cost and turbomachinery cost. While CAES turbo machinery with both HP and LP combustors and turbines would theoretically have better performance and economics than that of the present invention, high pressure combustors for operation at available high storage pressures do not presently exist, and the present invention is the best compromise which utilizes proven components.

As will be apparent to one skilled in the art, combustors and turbines may be varied in size and shape and may utilize various arrangements for injecting fuel, premixing air, and controlling temperatures and pressures in order to decrease an expansion ratio.

While the teachings of the present invention may be practiced in other fields relating to the expansion of a gas, the invention will be described in an application relating to CAES systems in which a high pressure combustor is not necessary for proper operation of a high pressure turbine.

More specifically, the present invention operates primarily in two modes: the compression mode and the expansion, or power generation mode. During the compression mode, ambient air is drawn into a low pressure compressor which is powered by a generator/motor functioning as a motor and drawing power from a power grid. The compressor compresses air, thereby decreasing its volume and increasing its pressure and temperature. This compressed air is cooled by an intercooler in order to reduce the air temperature to the desired level before entering the high pressure compressor. The high pressure compressor further compresses the air to the desired level, while the aftercooler further cools the compressed air prior to entering the air storage device. Alternatively, any number of compressors may be used.

During the expansion (power generation) mode, compressed air from the air storage device is routed to a recuperator to heat such stored compressed air prior to delivery to the high pressure turbine which drives the generator/motor. The high pressure turbine's exhaust gas is input to a low pressure combustor where it is reheated through the use of fuel and expanded in a low pressure turbine. The low pressure turbine also drives the generator/motor, aiding in the production of power. The exhaust gas output by the low pressure turbine is utilized as the heating gas in the recuperator.

Due to a reduction in the expansion ratio of the low pressure turbine and an increase in the expansion ratio of the high pressure turbine, the temperature of the low pressure turbine exhaust gas is increased, thereby increasing temperatures associated with the recuperator and ultimately increasing the temperature of the compressed air that is pre-heated in the recuperator and input to the high pressure turbine.

Since parameters such as expansion ratios and temperature and pressure associated with compressors, turbines, combustors, recuperators and cooling devices depend largely on the characteristics of the specific system in use, the parameters set forth herein are not absolute, but rather are illustrative and meant to provide the reader with an appreciation of the interaction among and relative proportions of such parameters.

Thus it can be seen that there is provided a CAES system whereby the need for a high pressure combustor is eliminated by increasing the compressed air temperature input to a high pressure turbine. System optimization results in a reduction in the low pressure turbine expansion ratio and an increase in the high pressure turbine expansion ratio, which, in conjunction with the use of a recuperator, permit a high pressure turbine to function properly without the need for a high pressure combustor.

In addition, it is to be understood that the invention can be carried out by specifically different equipment and devices and that various modifications, both as to equipment details and operating procedures can be effected without departing from the spirit and scope of the claimed invention. More specifically, the present invention includes, but is not limited to, schemes in which any number of low pressure combustors may be utilized for a single low pressure turbine, or a scheme in which any practical number of compressors or turbines is used, or schemes incorporating any practical overall expansion ratio.

What is claimed is:

1. In a power plant of the type which produces compressed air by use of excess energy generated during off-peak load periods and accumulates said compressed air in an air storage device, the stored compressed air being withdrawn from said storage device and delivered to an expansion train during peak load periods for generation of peaking energy, said expansion train comprising a high pressure turbine and a low pressure turbine, a method of operating said expansion train comprising the steps of:
   heating in a recuperator compressed air from said storage device;
   providing heated air from recuperator directly to said high pressure turbine and using said heated air to drive said high pressure turbine without combustion thereof;
   supplying exhaust air from said high pressure turbine to a combustion chamber for combustion thereof to produce a resulting gas;
   supplying said resulting gas to an input of said low pressure turbine;
   modifying said low pressure turbine so as to decrease its expansion ratio while maintaining an essentially constant overall expansion ratio of said expansion train, whereby the temperature of its exhaust gas is increased; and
   supplying said exhaust gas from said low pressure turbine to said recuperator for heat exchange with said compressed air from said air storage device, the temperature of said exhaust gas from said low pressure turbine being sufficiently high that heat exchange with said compressed air raises the temperature of said compressed air enough to eliminate the need for combustion of said compressed air in a high pressure combustor.

2. The method of claim 1 wherein the number of turbine stages in said high pressure turbine is greater than the number of turbine stages in said low pressure turbine.

3. The method of claim 1 further comprising the step of modifying said high pressure turbine so as to increase its expansion ratio so as to maintain said overall expansion ratio essentially constant.

4. The method of claim 3 wherein said step of modifying said high pressure turbine comprises adding at least one turbine stage to said high pressure turbine.

5. The method of claim 1 wherein said overall expansion ratio is between approximately twenty and approximately one hundred.

6. The method of claim 1 wherein said overall expansion ratio is approximately sixty.

7. The method of claim 1 wherein said expansion ratio of said low pressure turbine is less than an expansion ratio of said high pressure turbine.

8. In a Compressed Air Energy Storage (CAES) system comprising a recuperator, a compression train and an expansion train, wherein said expansion train comprises a high pressure turbine, a low pressure combustor and a low pressure turbine, the improvement comprising the steps of:
   decreasing an expansion ratio of said low pressure turbine while maintaining an essentially constant overall expansion ratio of said expansion train whereby the temperature of an exhaust gas that is output by said low pressure turbine to said recuperator is increased, the temperature of said exhaust gas from said low pressure turbine being sufficiently high that heat exchange with compressed air in said recuperator raises the temperature of said compressed air enough to eliminate the need for combustion of said compressed air in a high pressure combustor supplying said high pressure turbine; and
   providing a compressed air supply means for transferring said compressed air from said recuperator to said high pressure turbine.

9. The method of claim 8 wherein the number of turbine stages in said high pressure turbine is greater than the number of turbine stages in said low pressure turbine.

10. The method of claim 8 wherein said increase in temperature of said low pressure turbine exhaust gas causes an increase in temperature of said compressed air within said compressed air supply means, said compressed air being input to said high pressure turbine.

11. The method of claim 8 further comprising the step of modifying said high pressure turbine so as to increase its expansion ratio to maintain said overall expansion ratio essentially constant.

12. The method of claim 11 wherein said step of modifying said high pressure turbine comprises adding at least one turbine stage to said high pressure turbine.

13. The method of claim 8 wherein said overall expansion ratio is between approximately twenty and approximately one hundred.

14. The method of claim 8 wherein said overall expansion ratio is approximately sixty.

15. The method of claim 8 wherein said expansion ratio of said low pressure turbine is less than an expansion ratio of said high pressure turbine.

16. A method for generating peaking or intermediate electricity from expansion of compressed air comprising the steps of:
   providing an expansion train including a low pressure turbine and a high pressure turbine, said low pressure turbine having an expansion ratio less than the expansion ratio of said high pressure turbine;
   compressing a quantity of air during an off-load period;

storing said compressed air in an air storage device;
pre-heating said compressed air in a recuperator;
expanding said pre-heated compressed air in said high pressure turbine;
combusting said expanded pre-heated compressed air in a combustion chamber to produce a resulting gas; and
expanding said resulting gas that is output by said combustion chamber in said low pressure turbine, wherein the temperature of said expanded resulting gas that is output by said low pressure turbine is sufficiently high that heat exchange with said compressed air in said recuperator raises the temperature of said compressed air enough to eliminate the need for combustion of said compressed air in a high pressure combustor supplying said high pressure turbine.

17. The method of claim 16 wherein the number of turbine stages in said high pressure turbine is greater than the number of turbine stages in said low pressure turbine.

18. The method of claim 16 wherein a reduction in an expansion ratio of said low pressure turbine provides an increase in the temperature of said expanded resulting gas that is output by said low pressure turbine.

19. The method of claim 16 wherein an expansion ratio of said low pressure turbine is sufficiently less than an expansion ratio of said high pressure turbine to provide said high pressure turbine with said compressed air of sufficient temperature to eliminate the need for combustion of said compressed air in a high pressure combustor.

20. The method of claim 19 wherein an overall expansion ratio is approximately equal to the pressure of said compressed air.

21. A Compressed Air Energy Storage (CAES) system comprising:
an electrical machine for use as a motor during a compression mode and for use as a generator during an expansion mode;
an air storage device for the storage of compressed air;
a compression train which compresses air and stores such compressed air in said air storage device during said compression mode, said compression train being selectively coupled to said electrical machine by a first clutch means;
a recuperator for pre-heating air that is compressed during said expansion mode and stored in said air storage device;
a high pressure turbine having a first expansion ratio and which is selectively coupled to said electrical machine by way of a second clutch means for expanding said pre-heated compressed air from said recuperator during an expansion mode without combustion thereof;
a low pressure combustor having an inlet coupled to an outlet of said high pressure turbine in which an exhaust gas that is output by said high pressure turbine is combined with a fuel and combusted to produce a mixture during an expansion mode;
a low pressure turbine having a second expansion ratio which is less than said first expansion ratio and having an inlet coupled to an outlet of said combustor in which said mixture is expanded during an expansion mode; and
means for supplying exhaust gas from said low pressure turbine to said recuperator for heat transfer, said exhaust gas having sufficient temperature that heat transfer in the recuperator raises the temperature of the compressed air enough to eliminate the need for a high pressure combustor supplying said high pressure turbine.

22. The CAES system of claim 21 wherein said high pressure turbine is provided with more turbine stages than said low pressure turbine.

23. In a power plant of the type which produces compressed air by use of excess energy generated during off-peak load periods and accumulates said compressed air in an air storage device, the stored compressed air being withdrawn from said storage device and delivered to an expansion train during peak periods for generation of additional energy , said expansion train comprising a high pressure turbine and a low pressure turbine, apparatus comprising:
means for providing heated air from a recuperator directly to said high pressure turbine, said high pressure turbine being driven by said heated air without combustion thereof;
a combustion chamber for combusting exhaust air from said high pressure turbine to produce a resulting gas;
means for supplying exhaust air from said high pressure turbine to said combustion chamber;
means for supplying said resulting gas from said combustion chamber to an input of said low pressure turbine;
means for supplying exhaust gas from said low pressure turbine to said recuperator for heat exchange with said compressed air from said storage device;
wherein an expansion ratio of said low pressure turbine is less than an expansion ratio of said high pressure turbine, thus providing said exhaust gas from said low pressure turbine with temperature sufficiently high that heat exchange with the compressed air raises the temperature of said compressed air enough to eliminate the need for combustion of said compressed air in a high pressure combustor.

24. The apparatus of claim 23 wherein said high pressure turbine is provided with more turbine stages than said low pressure turbine.

25. The method of claim 23 wherein an overall expansion ratio is between approximately twenty and approximately one hundred.

26. The method of claim 25 wherein said overall expansion ratio is approximately sixty.

* * * * *